US010186039B2

(12) United States Patent
Choi et al.

(10) Patent No.: US 10,186,039 B2
(45) Date of Patent: Jan. 22, 2019

(54) APPARATUS AND METHOD FOR RECOGNIZING POSITION OF OBSTACLE IN VEHICLE

(71) Applicants: HYUNDAI MOTOR COMPANY, Seoul (KR); KIA MOTORS CORPORATION, Seoul (KR); INDUSTRY-UNIVERSITY COOPERATION FOUNDATION HANYANG UNIVERSITY, Seoul (KR)

(72) Inventors: Jae Seob Choi, Hwaseong-si (KR); Seong Sook Ryu, Seoul (KR); Dae Joong Yoon, Hwaseong-si (KR); Jin Wook Choi, Goyang-si (KR); Eu Gene Chang, Gunpo-si (KR); Ho Gi Jung, Seoul (KR); Jae Kyu Suhr, Incheon (KR)

(73) Assignees: HYUNDAI MOTOR COMPANY, Seoul (KR); KIA MOTORS CORPORATION, Seoul (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 351 days.

(21) Appl. No.: 14/743,957

(22) Filed: Jun. 18, 2015

(65) Prior Publication Data
US 2016/0125588 A1    May 5, 2016

(30) Foreign Application Priority Data
Nov. 3, 2014  (KR) .................. 10-2014-0151564

(51) Int. Cl.
*G06T 7/13*  (2017.01)
*H04N 5/232*  (2006.01)

(52) U.S. Cl.
CPC ........ *G06T 7/13* (2017.01); *G06T 2207/10016* (2013.01); *G06T 2207/30261* (2013.01); *H04N 5/23229* (2013.01)

(58) Field of Classification Search
CPC ............................. G06T 7/0085; G06T 7/13
See application file for complete search history.

(56) References Cited

U.S. PATENT DOCUMENTS 6,958,770 B2   10/2005  Okada et al.
7,362,881 B2 *  4/2008  Hattori ............... B60R 1/00
                                                  382/103

(Continued)

FOREIGN PATENT DOCUMENTS

CN    102508246 A    6/2012
CN    103576154 A    2/2014

(Continued)

OTHER PUBLICATIONS

Notification of the First Office Action issued in Chinese Patent Application No. 201510388800X, dated Sep. 12, 2018; with English translation.

*Primary Examiner* — Jayanti K Patel
*Assistant Examiner* — Irfan Habib
(74) *Attorney, Agent, or Firm* — McDermott Will & Emery LLP

(57) ABSTRACT

An apparatus for recognizing a position of an obstacle in a vehicle obtains image data and ultrasonic sensor data through a camera and an ultrasonic sensor, detects linear edges perpendicular to a ground surface in the image data, detects a discontinuous position at which the ultrasonic sensor data are not continuous, detects intersection points of the linear edges detected in continuous images from the (Continued)

image data when the discontinuous position coincides with a camera position, and estimates the intersection points to be the position of the obstacle.

18 Claims, 7 Drawing Sheets

(56) References Cited

U.S. PATENT DOCUMENTS

| | | | | |
|---|---|---|---|---|
| 7,512,494 B2* | 3/2009 | Nishiuchi | ......... | G06K 9/00805 348/155 |
| 8,004,424 B2* | 8/2011 | Matsuoka | ............. | B60Q 9/008 340/435 |
| 8,401,235 B2* | 3/2013 | Lee | ....................... | G01S 15/025 340/435 |
| 8,582,888 B2* | 11/2013 | Tanaka | ............... | G06K 9/00449 382/151 |
| 8,842,495 B2* | 9/2014 | Hersey | .................... | G01S 7/536 367/118 |
| 9,020,442 B1* | 4/2015 | Mastio | .................. | G01S 13/767 455/67.11 |
| 9,131,120 B2* | 9/2015 | Schofield | .................. | B60R 1/00 |
| 9,224,060 B1* | 12/2015 | Ramaswamy | ..... | G06K 9/00912 |
| 9,354,046 B2* | 5/2016 | Tohara | ................... | G01B 11/25 |
| 9,529,074 B2* | 12/2016 | Mastio | .................... | G01S 5/021 |
| 9,656,691 B2* | 5/2017 | Heimberger | ......... | B62D 15/027 |
| 2002/0094110 A1* | 7/2002 | Okada | ..................... | G06T 15/10 382/104 |
| 2003/0076414 A1* | 4/2003 | Sato | ........................ | G01S 11/12 348/148 |
| 2004/0158355 A1* | 8/2004 | Holmqvist | ........... | G05D 1/0236 700/245 |
| 2005/0004761 A1* | 1/2005 | Takahama | ............. | G01S 17/023 701/301 |
| 2007/0058838 A1* | 3/2007 | Taniguchi | .......... | G06K 9/00664 382/103 |
| 2007/0076526 A1* | 4/2007 | Aikyo | .................... | G01S 15/003 367/128 |
| 2008/0036580 A1* | 2/2008 | Breed | ............... | B60R 21/01536 340/438 |
| 2008/0246843 A1* | 10/2008 | Nagata | ..................... | B60R 1/00 348/148 |
| 2008/0281553 A1* | 11/2008 | Frank | ................. | A63B 24/0021 702/150 |
| 2009/0243826 A1* | 10/2009 | Touge | ..................... | B60Q 9/00 340/436 |
| 2010/0045448 A1* | 2/2010 | Kakinami | ................ | B60R 1/00 340/435 |
| 2010/0082206 A1* | 4/2010 | Kollar | ..................... | E05F 15/43 701/49 |
| 2010/0134321 A1* | 6/2010 | Kim | ........................ | G01S 7/539 340/932.2 |
| 2010/0235035 A1* | 9/2010 | Nishira | ..................... | B60T 7/22 701/31.4 |
| 2010/0238051 A1* | 9/2010 | Suzuki | ...................... | B60R 1/00 340/932.2 |
| 2010/0245574 A1* | 9/2010 | Imanishi | ................... | B60R 1/00 348/148 |
| 2011/0063097 A1* | 3/2011 | Naka | .................. | G06K 9/00798 340/435 |
| 2011/0116717 A1* | 5/2011 | Lee | ........................ | G01S 15/025 382/199 |
| 2012/0327239 A1* | 12/2012 | Inoue | ....................... | B60R 1/00 348/148 |
| 2013/0002470 A1* | 1/2013 | Kambe | .................. | G01S 13/867 342/55 |
| 2013/0120161 A1* | 5/2013 | Wakabayashi | ..... | B62D 15/0295 340/932.2 |
| 2013/0242101 A1 | 9/2013 | Schneider et al. | | |
| 2014/0035775 A1 | 2/2014 | Zeng et al. | | |
| 2014/0152774 A1* | 6/2014 | Wakabayashi | ......... | G08G 1/168 348/46 |
| 2014/0169630 A1* | 6/2014 | Fukata | .................... | G08G 1/167 382/103 |
| 2014/0354815 A1 | 12/2014 | Hughes et al. | | |
| 2014/0368656 A1* | 12/2014 | Hayakawa | ................ | G06T 7/13 348/148 |
| 2015/0130640 A1* | 5/2015 | Ryu | ......................... | G08G 1/168 340/932.2 |
| 2016/0101779 A1* | 4/2016 | Katoh | ...................... | G06T 7/20 340/435 |
| 2016/0320477 A1* | 11/2016 | Heimberger | .......... | B60W 30/06 |
| 2017/0098306 A1* | 4/2017 | Nasu | ........................ | G06K 9/03 |
| 2017/0140230 A1* | 5/2017 | Yoshida | ............... | G06K 9/3233 |
| 2018/0189578 A1* | 7/2018 | Yang | .................. | G01C 21/3635 |
| 2018/0253835 A1* | 9/2018 | Pallath | .................... | G06T 7/001 |

FOREIGN PATENT DOCUMENTS

| | | |
|---|---|---|
| CN | 104081443 A | 10/2014 |
| JP | 2007-140852 A | 6/2007 |
| JP | 2009-083743 A | 4/2009 |
| JP | 2011-180688 A | 9/2011 |
| JP | 2013-504830 A | 2/2013 |
| JP | 5511431 B2 | 6/2014 |
| KR | 10-1244605 B1 | 3/2013 |
| KR | 10-2013-0072709 A | 7/2013 |
| KR | 10-1283792 B1 | 7/2013 |

* cited by examiner

APPARATUS AND METHOD FOR RECOGNIZING POSITION OF OBSTACLE IN VEHICLE

CROSS-REFERENCE TO RELATED APPLICATION

This application is based on and claims the benefit of priority to Korean Patent Application No. 10-2014-0151564, filed on Nov. 3, 2014 in the Korean Intellectual Property Office, the disclosure of which is incorporated herein in its entirety by reference.

TECHNICAL FIELD

The present disclosure relates to an apparatus and a method for recognizing a position of an obstacle in a vehicle, and more particularly, to an apparatus and a method for recognizing a position of an obstacle in a vehicle capable of precisely measuring the position of the obstacle using image information.

BACKGROUND

In accordance with combination between an automobile and an information technology (IT) technology, many studies on an intelligent automobile technology have been conducted. Among them, a parking support system assisting in parking a vehicle has been applied to the automobile and commercialized.

The parking support system measures a position of an obstacle using an ultrasonic sensor, a laser scanner, a camera, and the like, to recognize a parking space.

The parking support system using the ultrasonic sensor may not accurately detect positions of edges of an obstacle (for example, a vehicle) due to physical characteristics of the ultrasonic sensor. For example, it is difficult for the parking support system to precisely measure a position of a narrow pillar or a circular pillar through the ultrasonic sensor.

SUMMARY

The present disclosure has been made to solve the above-mentioned problems occurring in the prior art while advantages achieved by the prior art are maintained intact.

An aspect of the present disclosure provides an apparatus and a method for recognizing a position of an obstacle in a vehicle capable of precisely measuring the position of the obstacle by detecting linear edges of the obstacle perpendicular to a ground surface in image information.

According to an exemplary embodiment of the present disclosure, a method for recognizing a position of an obstacle in a vehicle includes: obtaining image data and ultrasonic sensor data through a camera and an ultrasonic sensor, respectively; detecting linear edges perpendicular to a ground surface in the image data; detecting a discontinuous position at which the ultrasonic sensor data are not continuous; detecting intersection points of the linear edges detected in continuous images from the image data when the discontinuous position coincides with a camera position; and estimating the intersection points to be the position of the obstacle.

The detecting of the linear edges may include: performing a distance transform based on an edge image of the image data; creating a polar histogram in the image on which the distance transform is performed; and extracting linear edges in which the most edge pixels are distributed through the polar histogram.

In the detecting of the linear edges, the linear edges may be detected by estimating linear edge start and end positions of the obstacle in the image data based on camera information and obstacle information.

In the detecting of the discontinuous position, it may be confirmed whether the discontinuous position coinciding with the camera position is an obstacle sensing start position.

In the detecting of the intersection points of the linear edges, intersection points of straight lines extended from linear edges detected in the image data and the following image toward the camera may be detected upon determination that the camera position is the obstacle sensing start position.

In the detecting of the discontinuous position, it may be confirmed whether the discontinuous position coinciding with the camera position is an obstacle sensing end position.

In the detecting of the intersection points of the linear edges, intersection points of straight lines extended from linear edges detected in the image data and the previous image toward the camera may be detected upon determination that the camera position is the obstacle sensing end position.

In the detecting of the intersection points of the linear edges, one point at which a vertical distance to the straight lines is minimum may be detected.

According to another exemplary embodiment of the present disclosure, an apparatus for recognizing a position of an obstacle in a vehicle includes: a camera configured to photograph image data around the vehicle; an ultrasonic sensor configured to sense an obstacle around the vehicle; and a controller configured to detect linear edges perpendicular to a ground surface in the image data to register the linear edges in a storing means based on movement information of the vehicle, detect a discontinuous position of ultrasonic sensor data output from the ultrasonic sensor, and detect intersection points of linear edges detected in continuous image data obtained within a predetermined distance based on a camera position when the discontinuous position coincides with the camera position to recognize the intersection points to be positions of edges of the obstacle.

The controller may transform the image data into an edge image, perform a distance transform on the edge image, and then create a polar histogram to extract linear edges in which the most edge pixels are distributed.

The controller may estimate linear edge start and end positions of the obstacle in the image data based on camera information and obstacle information to detect the linear edges.

The controller may detect intersection points of the linear edges within an interest region set based on the ultrasonic sensor data.

The controller may detect intersection points of straight lines extended from linear edges detected in the image data and the following image data toward the camera when the camera position coincides with an obstacle sensing start position.

The controller may detect intersection points of straight lines extended from linear edges detected in the image data and the previous image data toward the camera when the camera position coincides with an obstacle sensing end position.

The controller may detect intersection points of straight lines extended from linear edges detected in the image data and the previous image data toward the camera when the camera position coincides with an obstacle sensing end position.

The controller may calculate one point on a straight line at which a vertical distance to the straight lines is minimum.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

The present disclosure is to precisely estimate a position of an obstacle using a feature that linear edges of an obstacle perpendicular to a ground surface in a real world meet each other at one point in an around view monitoring (AVM) image in the case in which a curvature of the obstacle is small and a position of this point becomes a contour point position of the obstacle.

Figure 1:
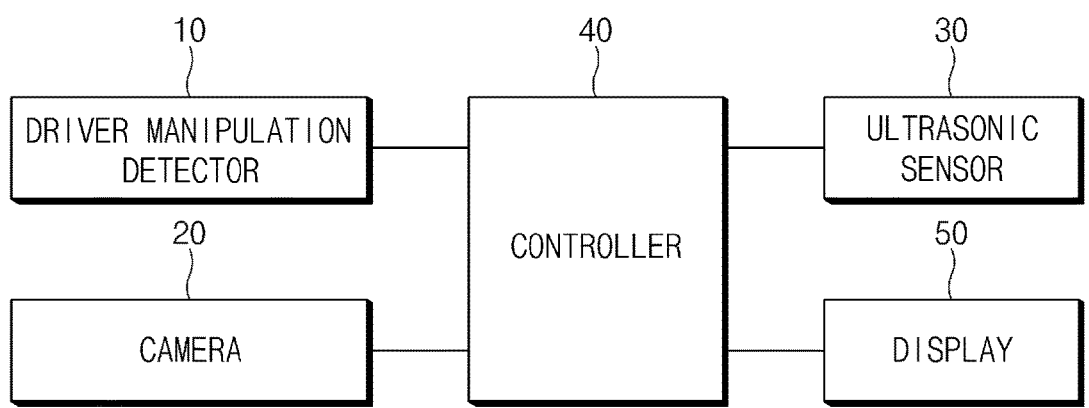
FIG. 1 is a block diagram illustrating an apparatus for recognizing a position of an obstacle in a vehicle according to an exemplary embodiment of the present disclosure.
Figure 2:
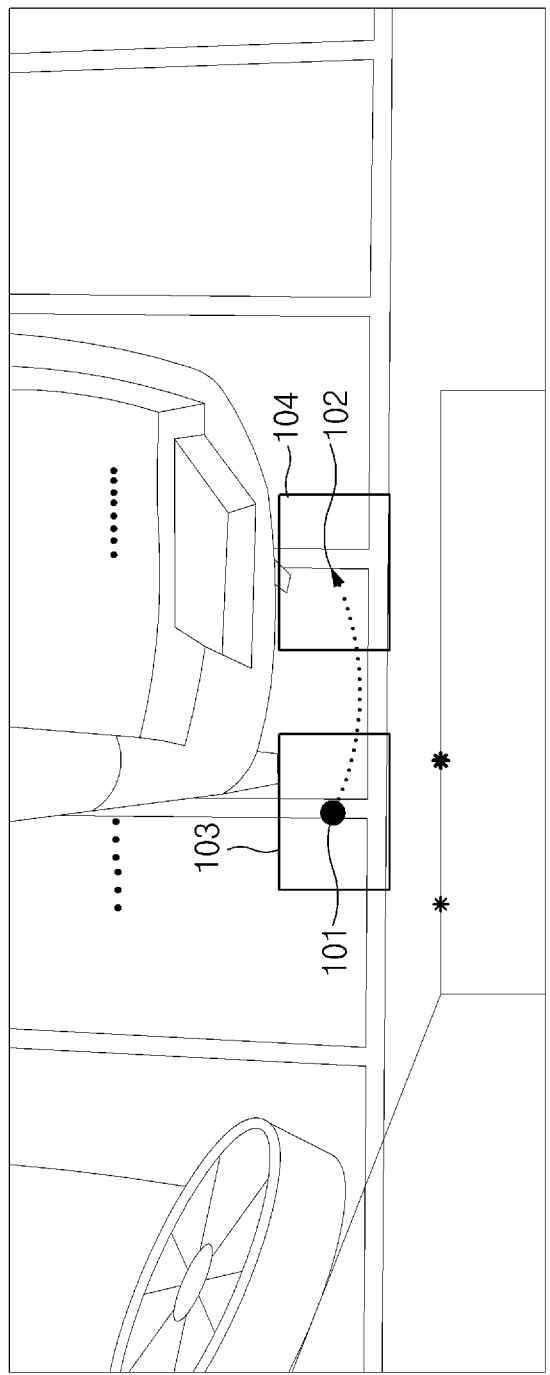
FIG. 2 is a view illustrating an example of setting an interest region according to the present disclosure.
Figure 3:
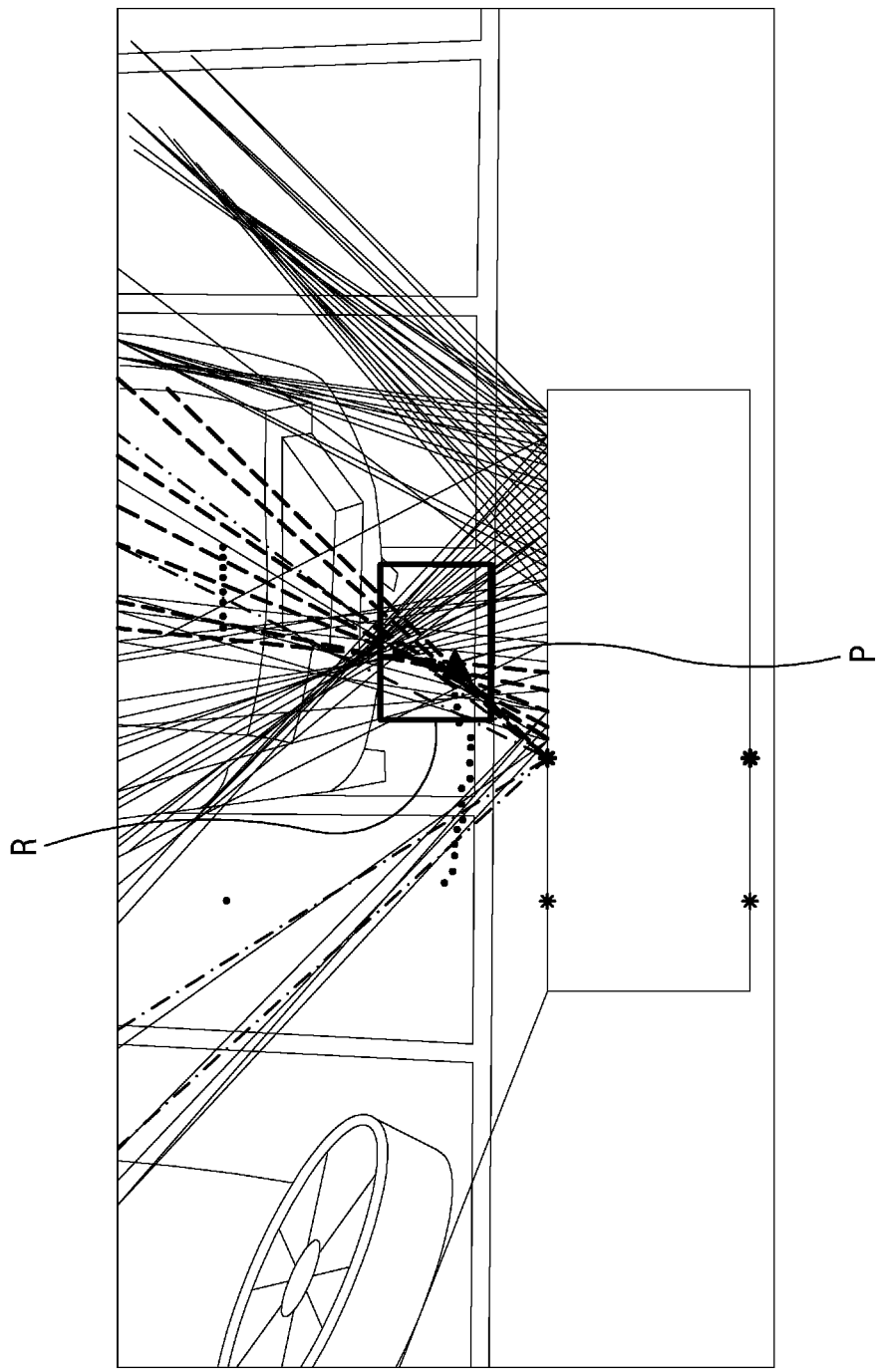
FIG. 3 is a view illustrating an example of detecting positions of edges of an obstacle according to the present disclosure.

FIG. 1 is a block diagram illustrating an apparatus for recognizing a position of an obstacle in a vehicle according to an exemplary embodiment of the present disclosure, FIG. 2 is a view illustrating an example of setting an interest region according to the present disclosure, and FIG. 3 is a view illustrating an example of detecting positions of edges of an obstacle according to the present disclosure.

Referring to FIG. 1, the apparatus for recognizing a position of an obstacle in a vehicle is configured to include a driver manipulation detector 10, cameras 20, an ultrasonic sensor 30, a controller 40, and a display 50.

The driver manipulation detector 10 detects input information depending on driver manipulation. Here, the input information includes whether or not a parking support function is activated, information on a position of a shift lever, a steering angle of a steering wheel, and the like.

A plurality of cameras 20, which photograph an image around the vehicle, may be installed in the vehicle. For example, the cameras 20 may be each installed in the front, the rear, and both side mirrors of the vehicle.

In addition, the cameras 20 may be implemented as a super wide angle camera that may secure a wide viewing angle.

The ultrasonic sensor 30 serves to detect an obstacle positioned around the vehicle. The ultrasonic sensor 30 measures a time interval between transmitting an ultrasonic wave and receiving a reflected wave reflected on the obstacle and returning to the ultrasonic sensor 30 or measures a signal magnitude of the reflected wave. In addition, the ultrasonic sensor 30 may calculate a distance from the vehicle to the obstacle using the measured time interval between transmitting the ultrasonic wave and receiving the reflected wave.

The controller 40 obtains image data around the vehicle and ultrasonic sensor data through the cameras 20 and the ultrasonic sensor 30. Here, the controller 40 obtains image data and ultrasonic sensor data through the cameras 20 and the ultrasonic sensor 30 per predetermined time or whenever the vehicle moves by a predetermined distance.

The controller 40 sets an interest region for recognizing edges of the obstacle using the ultrasonic sensor data output from the ultrasonic sensor 30. Here, the interest region, which is a region in which obstacle position estimation is to be performed, is a predetermined region set based on a boundary position between the obstacle and an empty space.

That is, the controller 40 detects a discontinuous position at which the ultrasonic sensor data are rapidly changed and sets a region corresponding to a size preset based on the discontinuous position to the interest region. For example, the controller 40 detects a falling position 101 at which the ultrasonic sensor data rapidly fall and a rising position 102 at which the ultrasonic sensor data rapidly rise and sets interest regions 103 and 104 at a size of width 140 cm×length 100 cm based on the detected positions 101 and 102, as illustrated in FIG. 2.

The controller 40 detects linear edges of the obstacle perpendicular to a ground surface in the image data. A detailed method for detecting the linear edges of the obstacle perpendicular to the ground surface in the image will be separately described below.

The controller 40 stores the linear edges detected in the image data in a storing means (not illustrated) based on movement information of the vehicle.

In addition, the controller 40 confirms whether the discontinuous position and a position of the camera coincide with each other when the discontinuous position is detected based on the ultrasonic sensor data. That is, the controller 40 confirms whether a current point in time is a point in time in which intersection points of the linear edges are to be detected. Here, the controller 40 confirms whether the discontinuous position is a start position (obstacle contour start point) at which the obstacle starts to be sensed or an end position (obstacle contour end point) at which the sensing of the obstacle ends.

The controller 40 detects intersection points of linear edges detected in current image data and the following image data when the discontinuous position coinciding with a center position (camera position) of the camera 20 is an obstacle sensing start position (rising position). Here, the controller 40 uses linear edges detected in image data obtained within a predetermined distance in a vehicle movement direction from a current camera position.

Meanwhile, the controller 40 detects intersection points of linear edges detected in the current image data and the previous image data when the discontinuous position coinciding with the camera position is an obstacle sensing end position (falling position). Here, the controller 40 uses linear edges detected in image data obtained within a predetermined distance in an opposite direction to the vehicle movement direction from the current camera position.

In order to detect the intersection points of the linear edges, the controller 40 integrates linear edges detected in continuous images (current image and previous image or current image and following image) based on the movement information of the vehicle with each other. For example, the controller 40 estimates positions, on the current image, of the linear edges detected in the previous image (image data), based on the movement information of the vehicle, and then integrates the estimated positions with the linear edges detected in the current image. As illustrated in FIG. 3, straight lines (solid lines) connecting linear edges detected in the previous images to the center position of the camera to each other and straight lines (dot-dash lines) connecting linear edges detected in an image obtained in a current point in time to the center position of the camera 20 to each other are integrated with each other.

The controller 40 detects intersection points of straight lines connecting the linear edges detected in the continuous images and the center position of the camera to each other in the interest region. Here, the controller 40 detects a point at which a vertical distance to the straight lines is minimum to be the intersection point. In other words, the controller 40 removes outliers using a random sample consensus (RANSAC) scheme and detects an intersection point P between the linear edges (dash lines) detected in the interest region R (See FIG. 3).

The controller 40 estimates the detected intersection points to be a position of the edge of the obstacle. That is, the controller 40 recognizes the detected intersection points to be a position of the obstacle.

The display 50 displays the position of the edge of the obstacle so as to be overlapped with the image data depending on a control of the controller 40. Here, the display 50 displays the position of the edge in a form such as a specific shape, a rod shape, a number, a text, a symbol, a graphic, an image, or the like.

The display 50 may be implemented by a pilot lamp, a light emitting diode (LED), an electro-luminescence element (EL), a vacuum fluorescence display (VFD), a cathode ray tube (CRT), a plasma display, a liquid crystal display (LCD), a head up display, (HUD), or the like.

Next, a method for detecting linear edges of an obstacle perpendicular to a ground surface in an image will be described in detail.

As a method for detecting linear edges, there are two methods. A first method for detecting linear edges is a method for detecting linear edges by estimating linear edge start and end positions of an obstacle in image data based on camera and obstacle position information in a real world. A second method for detecting linear edges is a method for detecting linear edges by predicting a region in which it is likely that straight lines perpendicular to a ground surface will be distributed in an image and creating a polar histogram in only the corresponding region.

First, the first method for detecting linear edges will be described with reference to FIGS. 4 and 5. Here, FIG. 4 is an illustrative view illustrating image data obtained by photographing linear edges of an obstacle perpendicular to a ground surface in a real world according to the present disclosure, and FIG. 5 is a view illustrating a relationship between the linear edges of the obstacle perpendicular to the ground surface in the real world according to the present disclosure and linear edges within image data.

Figure 4:
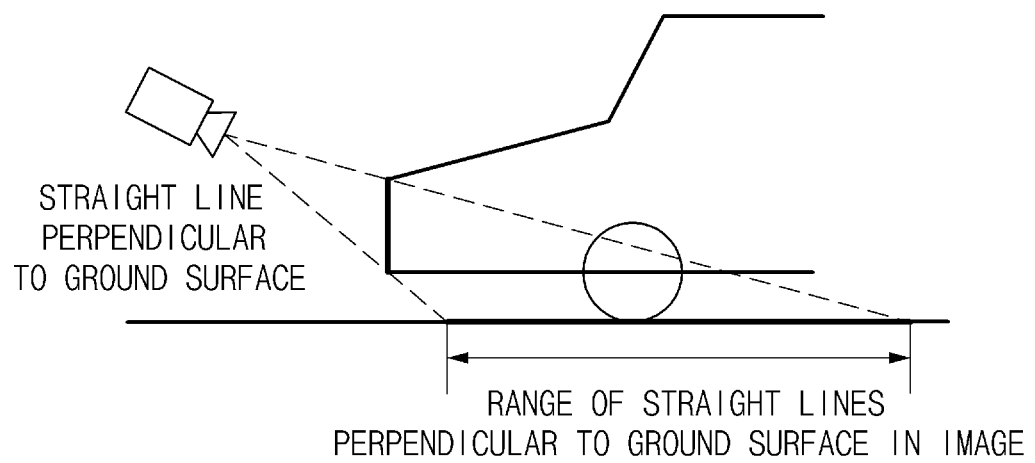
FIG. 4 is an illustrative view illustrating image data obtained by photographing linear edges of an obstacle perpendicular to a ground surface in a real world according to the present disclosure.
Figure 4:
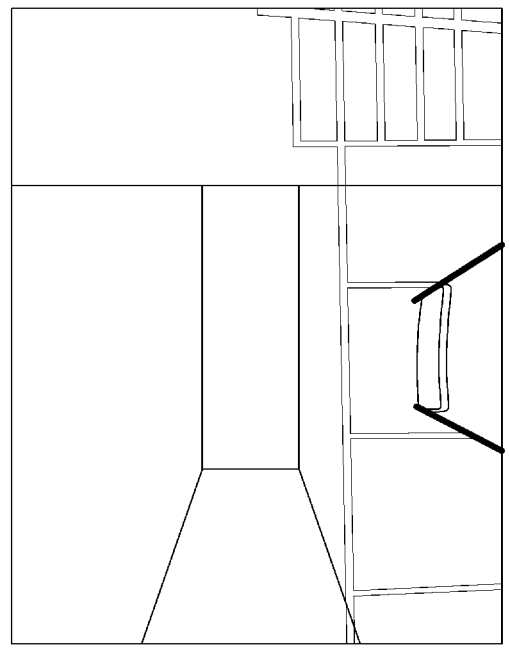
Figure 5:
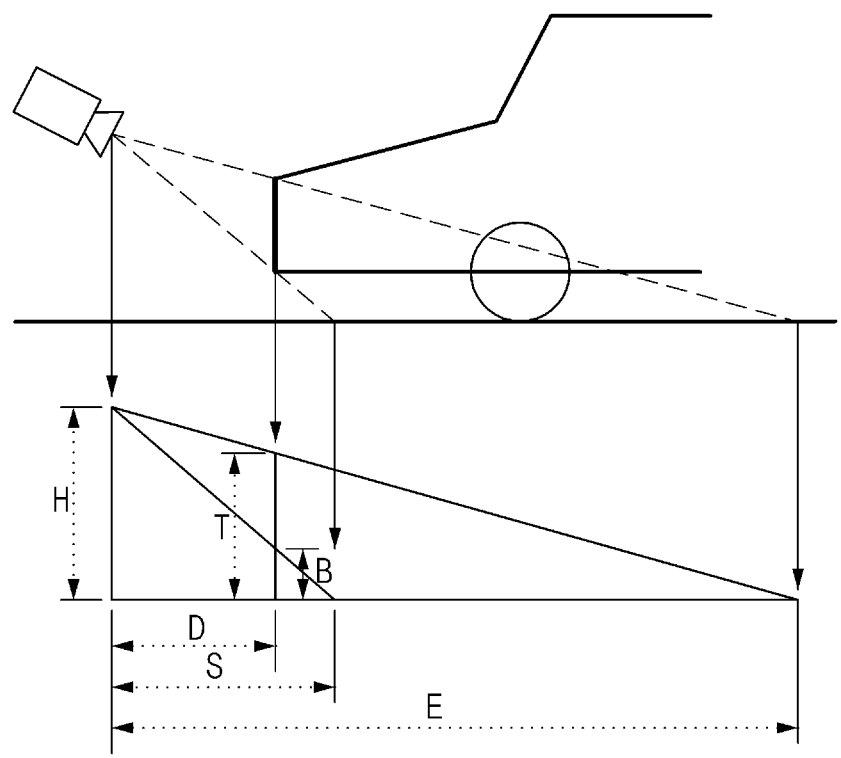
FIG. 5 is a view illustrating a relationship between the linear edges of the obstacle perpendicular to the ground surface in the real world according to the present disclosure and linear edges within image data.

As illustrated in FIG. 4, linear edges of an obstacle perpendicular to a ground surface in a real world appear in an oblique line form in an image. Start positions S and end positions E of the linear edges are calculated using the following Equation 1 and Equation 2, respectively.

$$S = \frac{H \cdot D}{H - B} \quad \text{[Equation 1]}$$

$$E = \frac{H \cdot D}{H - T} \quad \text{[Equation 2]}$$

Here, H means a camera height, which is a distance from the ground surface to a point at which the camera 20 is installed. The camera height may be recognized in advance through a camera calibration process.

D is a distance from the vehicle to the obstacle measured through the ultrasonic sensor 30, T is a height of an upper end of the obstacle, and B is a height of a lower end of the obstacle. The height T of the upper end of the obstacle and the height B of the lower end of the obstacle may be assumed based on a general reference (for example, a bumper of the vehicle).

Next, the method for detecting linear edges by predicting a region in which it is likely that straight lines perpendicular to a ground surface will be distributed in an image and creating a polar histogram in only the corresponding region will be described.

First, the controller 40 processes the image data obtained through the camera 20 to extract an edge image (binary data). Here, the controller 40 transforms the image data into the edge image using a predetermined edge extracting scheme such as a Sobel edge extracting scheme, or the like.

In addition, the controller 40 performs a distance transform on the edge image detected from the image data and then creates a polar histogram. That is, the controller 40 searches the image radially from the center position of the camera 20 to extract a distribution of edges. Here, the controller 40 does not create the polar histogram for a region in which the ultrasonic sensor data are not present.

The controller 40 detects positions of local minima in which an accumulated value (accumulation of pixel values) is smaller than a threshold value in the polar histogram to be the linear edges of the obstacle perpendicular to the ground surface (hereinafter, referred to as linear edges). Here, the smaller the accumulated value, the more the number of edge pixels.

As described above, the controller 40 detects the linear edges of the obstacle perpendicular to the ground surface in the image data using the local minima of the polar histogram. When the linear edges perpendicular to the ground surface in the real world are extended in an omni-directional image (bird's eye view image), they pass through a position of the camera 20. That is, the controller 40 detects the linear edge directed toward the center of the camera 20 in the image data using the polar histogram.

Figure 6:
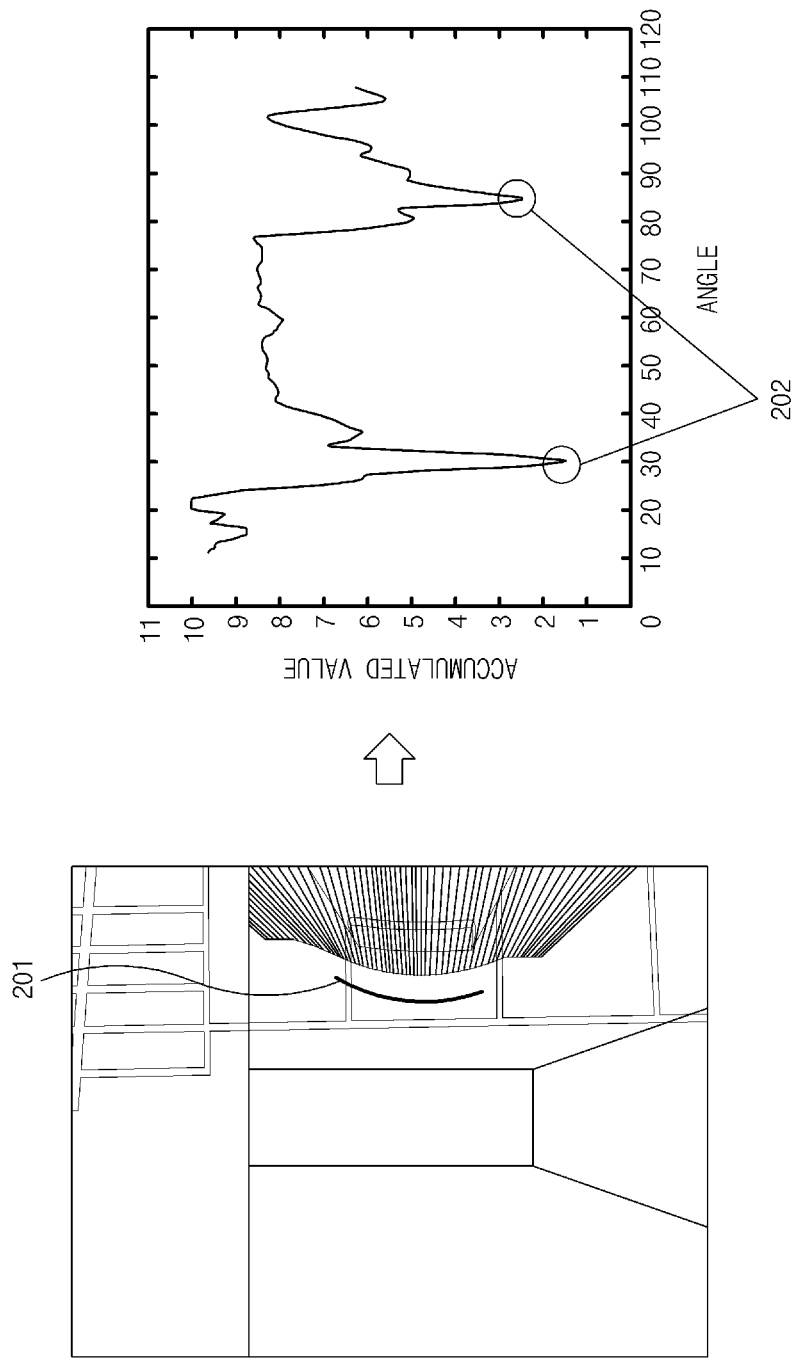
FIG. 6 is a view illustrating an example of creating a polar histogram according to the present disclosure.

For example, as illustrated in FIG. 6, the controller creates the polar histogram in a region in which the ultrasonic sensor data 201 are present, and detects the local minima 202 of the polar histogram to be the linear edges.

Figure 7:
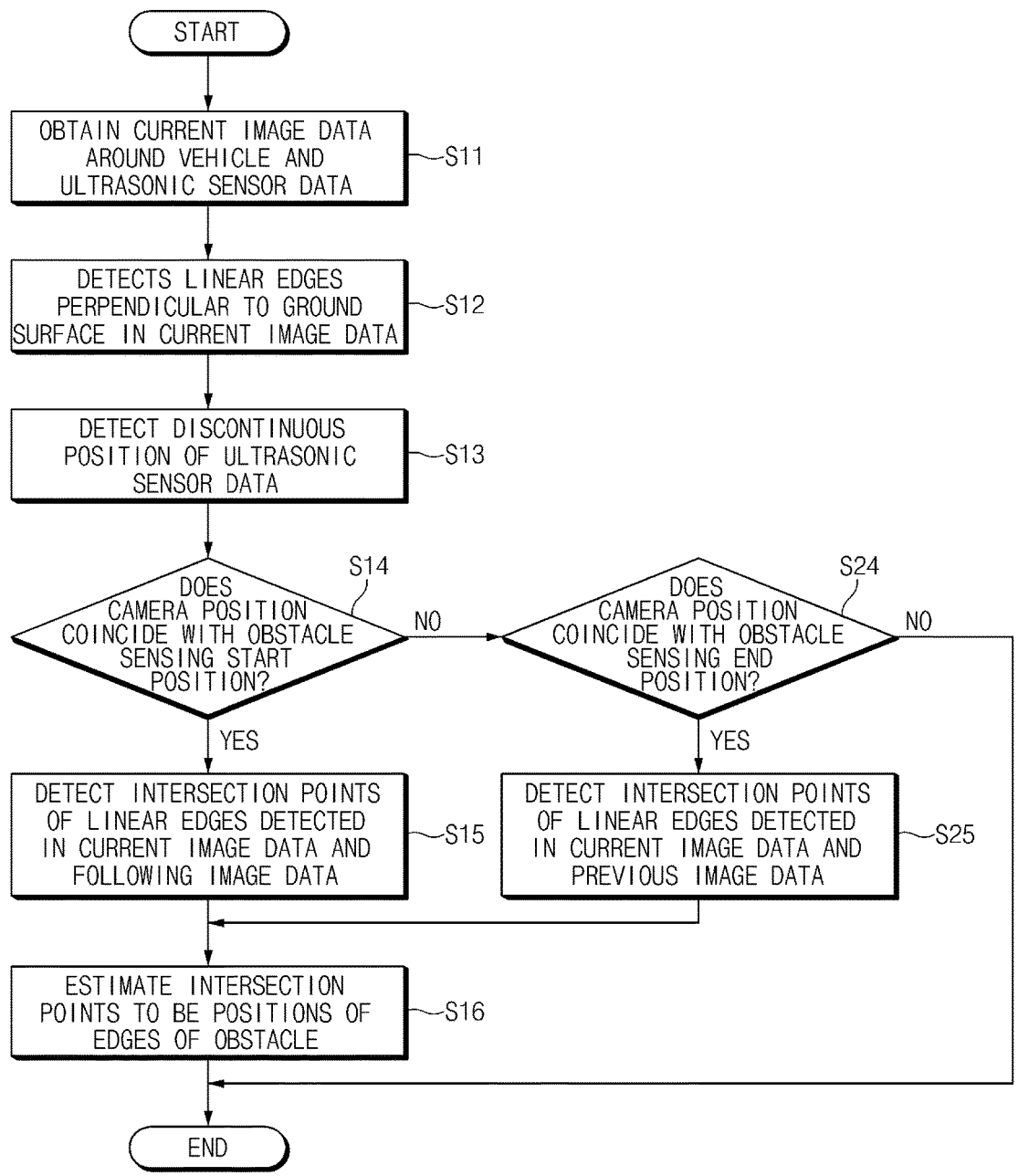
FIG. 7 is a flow chart illustrating a method for recognizing a position of an obstacle in a vehicle according to an exemplary embodiment of the present disclosure.

FIG. 7 is a flow chart illustrating a method for recognizing a position of an obstacle in a vehicle according to an exemplary embodiment of the present disclosure.

First, the controller 40 obtains the image data around the vehicle and the ultrasonic sensor data through the cameras 20 and the ultrasonic sensor 30 (S11).

The controller 40 detects the linear edges perpendicular to the ground surface in the image data using the local minima of the polar histogram (S12). In other words, the controller 40 detects the linear edges directed toward the camera 20 in the image data.

Here, in order to detect the linear edges in the image, the controller 40 transforms the image data photographed through the camera 20 into the edge image and performs the distance transform on the transformed edge image. In addition, the controller 40 creates the polar histogram in the image on which the distance transform is performed, and detects minima less than a threshold value in the polar histogram to detect the linear edges. That is, the controller 40 extracts the linear edges in which the most edge pixels are distributed through the polar histogram.

The controller 40 stores the detected linear edges together with camera position information depending on the movement of the vehicle in a memory (not illustrated).

The controller 40 detects the discontinuous position at which the ultrasonic sensor data are rapidly changed (S13).

The controller 40 confirms whether the discontinuous position and a camera position coincide with each other when the discontinuous position is detected. Here, the controller 40 confirms whether the camera position is a start position at which the obstacle starts to be sensed (S14).

The controller 40 detects the intersection points of the linear edges detected in the image data in the current point in time and the following image data (S15) when the controller 40 confirms that the camera position is an obstacle sensing start position.

In addition, the controller 40 estimates the detected intersection points to be the positions of the edges of the obstacle (S16).

Meanwhile, the controller 40 confirms whether the camera position is an obstacle sensing end position, which is a position in which the obstacle starts not to be sensed, (S24), when the controller 40 confirms that the camera position is not the obstacle sensing start position.

The controller 40 detects the intersection points of the linear edges detected in the image data in the current point in time and the previous image data (S25) when the controller 40 confirms that the camera position is the obstacle sensing end position. In order to detect the intersection points of the linear edges, the linear edges detected in the continuous images are integrated with each other based on the movement information of the vehicle, and intersection points of straight lines extended from the detected linear edges to the center position of the camera are detected. Here, in the present disclosure, the intersection points of the straight lines are detected using the RANSAC scheme of detecting one point on a straight line at which the vertical distance to the straight lines is minimum to be the intersection point.

In addition, the controller 40 according to the present disclosure detects the intersection points of the linear edges within the interest region set based on the ultrasonic sensor data.

According to the present disclosure, since a plurality of intersection points of the linear edges perpendicular to the ground surfaces are detected and intersection points created on a surface of the vehicle among the detected intersection points are removed, information on side contours of the obstacle as well as the position of the obstacle may be estimated. Therefore, in the case in which the present disclosure is applied to a parking space recognizing technology, a parking environment may be more precisely recognized.

In addition, in the present disclosure, when arranged and measured ultrasonic sensor data back-track at which position of obstacle they are measured and the arranged and measured ultrasonic sensor data and ultrasonic lobe model information are utilized, additional information on the positions of the edges of the obstacle may be obtained.

As described above, according to the exemplary embodiments of the present disclosure, the linear edges of the obstacle perpendicular to the ground surface in the real world are detected in the continuous images, and the intersection points of the detected linear edges are estimated to the positions of the edges of the obstacle to complement disadvantages of the ultrasonic sensor, thereby making it possible to precisely measure the position of the obstacle.

Although it has been described that all components configuring the exemplary embodiment of the present disclosure are combined with each other as one component or are combined and operated with each other as one component, the present disclosure is not necessarily limited to the above-mentioned exemplary embodiment. That is, all the components may also be selectively combined and operated with each other as one or more component without departing from the scope of the present disclosure. In addition, although each of all the components may be implemented by one independent hardware, some or all of the respective components which are selectively combined with each other may be implemented by a computer program having a program module performing some or all of functions combined with each other in one or plural hardware. Codes and code segments configuring the computer program may be easily inferred by those skilled in the art to which the present disclosure pertains. The computer program is stored in computer readable media and is read and executed by a computer, thereby making it possible to implement the exemplary embodiment of the present disclosure. An example of the computer readable media may include magnetic recording media, optical recording media, carrier wave media, and the like.

In addition, hereinabove, the terms "include", "configure", "have", or the like, are to be interpreted to imply the inclusion of other components rather than the exclusion of other components, since they mean that a corresponding component may be included unless particularly described otherwise. Unless defined otherwise, all the terms including technical and scientific terms have the same meaning as meanings generally understood by those skilled in the art to which the present disclosure pertains. Generally used terms such as terms defined in a dictionary should be interpreted as the same meanings as meanings within a context of the related art and should not be interpreted as ideally or excessively formal meanings unless clearly defined in the present specification.

The spirit of the present disclosure has been illustratively described hereinabove. It will be appreciated by those skilled in the art that various modifications and alterations may be made without departing from the essential characteristics of the present disclosure. Accordingly, exemplary embodiments disclosed in the present disclosure are not to limit the spirit of the present disclosure, but are to describe the spirit of the present disclosure. The scope of the present disclosure is not limited to these exemplary embodiments. The scope of the present disclosure should be interpreted by the following claims, and it should be interpreted that all the spirits equivalent to the following claims fall within the scope of the present disclosure.

What is claimed is:

1. A method for recognizing a position of an obstacle in a vehicle, comprising:
    obtaining image data and ultrasonic sensor data through a camera and an ultrasonic sensor, respectively;
    detecting edges of the obstacle perpendicular to a ground surface in the image data;
    detecting a discontinuous position at which the ultrasonic sensor data are not continuous;
    detecting intersection points of a straight line connecting edges of the obstacle detected in continuous images from the image data to a center position of the camera when the discontinuous position coincides with a camera position; and
    estimating the intersection points to be the position of the obstacle.

2. The method for recognizing a position of an obstacle in a vehicle according to claim 1, wherein the detecting of the edges of the obstacle includes:
    performing a distance transform based on an edge image of the image data;
    creating a polar histogram in the image on which the distance transform is performed; and
    extracting the edges of the obstacle in which most edge pixels are distributed through the polar histogram.

3. The method for recognizing a position of an obstacle in a vehicle according to claim 1, wherein in the detecting of the edges of the obstacle, the edges are detected by estimating edge start and end positions of the obstacle in the image data based on camera information and obstacle information.

4. The method for recognizing a position of an obstacle in a vehicle according to claim 1, the detecting of the discontinuous position further comprising confirming whether the discontinuous position coinciding with the camera position is an obstacle sensing start position.

5. The method for recognizing a position of an obstacle in a vehicle according to claim 4, wherein in the detecting of the intersection points of the straight line connecting the edges to the center position of the camera, intersection points of the straight lines extended from edges detected in the image data and a following image toward the camera are detected upon confirmation that the camera position is the obstacle sensing start position.

6. The method for recognizing a position of an obstacle in a vehicle according to claim 5, wherein in the detecting of the intersection points of the straight line connecting the edges to the center position of the camera, one point at which a vertical distance to the straight lines is minimum is detected.

7. The method for recognizing a position of an obstacle in a vehicle according to claim 1, wherein in the detecting of the discontinuous position, it is confirmed whether the discontinuous position coinciding with the camera position is an obstacle sensing end position.

8. The method for recognizing a position of an obstacle in a vehicle according to claim 7, wherein in the detecting of the intersection points of the straight line connecting the edges to the center position of the camera, intersection points of the straight lines extended from edges detected in the image data and previous image data toward the camera are detected upon confirmation that the camera position is the obstacle sensing end position.

9. The method for recognizing a position of an obstacle in a vehicle according to claim 8, wherein in the detecting of the intersection points of the straight line connecting the edges of the obstacle to the center position of the camera, one point at which a vertical distance to the straight lines is minimum is detected.

10. An apparatus for recognizing a position of an obstacle in a vehicle, comprising:
    a camera configured to photograph image data around the vehicle;
    an ultrasonic sensor configured to sense an obstacle around the vehicle; and
    a controller configured to detect edges of the obstacle perpendicular to a ground surface in the image data to register the edges of the obstacle in a storage based on movement information of the vehicle, detect a discontinuous position of ultrasonic sensor data output from the ultrasonic sensor, and detect intersection points of a straight line connecting the edges detected in continuous image data obtained within a predetermined distance based on a camera position to a center position of the camera when the discontinuous position coincides with the camera position to recognize the intersection points of the straight line connecting the edges to the center position of the camera to be positions of edges of the obstacle.

11. The apparatus for recognizing a position of an obstacle in a vehicle according to claim 10, wherein the controller transforms the image data into an edge image, performs a distance transform on the edge image, and then creates a polar histogram to extract the edges of the line of the obstacle in which most edge pixels are distributed.

12. The apparatus for recognizing a position of an obstacle in a vehicle according to claim 10, wherein the controller estimates edge start and end positions of the obstacle in the image data based on camera information and obstacle information to detect the edges.

13. The apparatus for recognizing a position of an obstacle in a vehicle according to claim 10, wherein the controller detects intersection points of the straight line connecting the edges within an interest region set based on the ultrasonic sensor data to the center position of the camera.

14. The apparatus for recognizing a position of an obstacle in a vehicle according to claim 10, wherein the controller detects intersection points of straight lines extended from the edges detected in the image data and a following image data toward the camera when the camera position coincides with an obstacle sensing start position.

15. The apparatus for recognizing a position of an obstacle in a vehicle according to claim 10, wherein the controller detects intersection points of straight lines extended from the edges detected in the image data and a following image data toward the camera when the camera position coincides with an obstacle sensing start position.

16. The apparatus for recognizing a position of an obstacle in a vehicle according to claim 15, wherein the controller calculates one point on a straight line at which a vertical distance to the straight lines is minimum.

17. The apparatus for recognizing a position of an obstacle in a vehicle according to claim 10, wherein the controller detects intersection points of straight lines extended from the edges detected in the image data and previous image data toward the camera when the camera position coincides with an obstacle sensing end position.

18. The apparatus for recognizing a position of an obstacle in a vehicle according to claim 17, wherein the controller calculates one point on a straight line at which a vertical distance to the straight lines is minimum.

* * * * *